US011980781B2

(12) United States Patent
Moser

(10) Patent No.: US 11,980,781 B2
(45) Date of Patent: May 14, 2024

(54) PROTECTIVE CLOTHING AND PROTECTIVE SHROUD/HOOD WITH FAN

(71) Applicant: Kandis Moser, Sinking Springs, PA (US)

(72) Inventor: Kandis Moser, Sinking Springs, PA (US)

( * ) Notice: Subject to any disclaimer, the term of this patent is extended or adjusted under 35 U.S.C. 154(b) by 52 days.

(21) Appl. No.: 17/370,542

(22) Filed: Jul. 8, 2021

(65) Prior Publication Data

US 2022/0008758 A1 Jan. 13, 2022

Related U.S. Application Data

(60) Provisional application No. 63/049,659, filed on Jul. 9, 2020.

(51) Int. Cl.

| | |
|---|---|
| ***A62B 17/00*** | (2006.01) |
| ***A41D 13/002*** | (2006.01) |
| ***A41D 13/11*** | (2006.01) |
| ***A41D 31/06*** | (2019.01) |
| ***A41D 31/08*** | (2019.01) |

(52) U.S. Cl.

CPC ........ *A62B 17/003* (2013.01); *A41D 13/0025* (2013.01); *A41D 13/1153* (2013.01); *A41D 31/065* (2019.02); *A41D 31/085* (2019.02); *A41D 2500/50* (2013.01)

(58) Field of Classification Search

CPC ..... A62B 17/003; A62B 17/04; A62B 17/006; A41D 31/26; A41D 31/085; A41D 13/0025; A41D 13/1153; A41D 13/00; A41D 2600/202; A42B 3/28; A42B 3/286

See application file for complete search history.

(56) References Cited

U.S. PATENT DOCUMENTS

| | | | | |
|---|---|---|---|---|
| 2,826,758 | A * | 3/1958 | Kahn | A41D 13/0025 2/81 |
| 5,564,124 | A * | 10/1996 | Elsherif | A41D 13/0025 2/457 |
| 5,711,033 | A * | 1/1998 | Green | F04D 17/16 2/424 |
| 7,534,005 | B1 | 5/2009 | Buckman | |
| 8,230,852 | B2 | 7/2012 | Zhang et al. | |
| 9,241,529 | B1 * | 1/2016 | Danelski | A42B 3/286 |
| 9,271,872 | B2 | 3/2016 | Becker et al. | |
| 10,137,662 | B2 | 11/2018 | Nutt et al. | |
| 10,939,712 | B1 * | 3/2021 | McBride | A61M 21/0094 |
| 2006/0048776 | A1 * | 3/2006 | Cunningham | A42B 3/286 128/201.22 |
| 2007/0094763 | A1 | 5/2007 | Silver | |

(Continued)

*Primary Examiner* — Patrick J. Lynch

(74) *Attorney, Agent, or Firm* — Potomac Law Group, PLLC

(57) ABSTRACT

An article of outerwear which resists ignition and insulates against heat, the article of outerwear has a plurality of sections made from a fabric, such as woven fabric, knit fabric or a combination thereof. The plurality of sections allow the article of outerwear to stretch enhancing the comfort of the wearer of the article of outerwear. The outerwear may include a protective shroud/hood which has fans to circulate air inside the protective shroud/hood, the fans having air intake openings and vent openings, the air intake openings opening in planes which are perpendicular to planes in which the vent openings open.

10 Claims, 7 Drawing Sheets

(56) References Cited

U.S. PATENT DOCUMENTS

| | | | | |
|---|---|---|---|---|
| 2007/0095344 | A1* | 5/2007 | Abernethy | A62B 17/006<br>128/201.22 |
| 2009/0044932 | A1* | 2/2009 | Blackstone | F24F 5/0017<br>165/158 |
| 2009/0271917 | A1* | 11/2009 | Richardson | A41D 13/0051<br>2/458 |
| 2011/0231977 | A1* | 9/2011 | Rupnick | A42B 3/286<br>454/239 |
| 2015/0059045 | A1* | 3/2015 | Supper | D04B 21/16<br>2/24 |
| 2015/0297920 | A1* | 10/2015 | Takeuchi | A62B 18/006<br>2/455 |
| 2017/0089669 | A1* | 3/2017 | Levine | F41H 1/02 |
| 2017/0203540 | A1* | 7/2017 | Colatruglio | A41D 31/102 |
| 2017/0332721 | A1* | 11/2017 | Otey | A42B 3/227 |
| 2017/0340036 | A1* | 11/2017 | Squires | A41D 13/0025 |
| 2019/0216143 | A1* | 7/2019 | Harris | A62B 17/003 |
| 2019/0350279 | A1* | 11/2019 | Clemente | A41D 13/0025 |

* cited by examiner

PROTECTIVE CLOTHING AND PROTECTIVE SHROUD/HOOD WITH FAN

CROSS REFERENCE TO RELATED APPLICATION

This application claims priority and the benefit of U.S. Provisional Patent Application Ser. No. 63/049,659 filed Jul. 9, 2020 entitled PROTECTIVE CLOTHING AND PROTECTIVE SHROUD/HOOD WITH FAN, which is incorporated by reference herein in its entirety.

FIELD OF THE INVENTION

The present invention is directed protective clothing which resists ignition and helps insulate against heat. The invention is also directed to protective shrouds or hoods with fans for directing the airflow.

BACKGROUND OF THE INVENTION

Each and every day, workers in the electrical maintenance, Utilities, oil, gas, petrochemical and steel industries work in environments that may expose them to hazards that could cause severe and/or fatal burn injuries. In the event of a momentary electric arc, flash fire, and/or molten metal splash exposure, standard work clothes that are not flame resistant may ignite and may continue to burn even after the source of ignition has been removed. Untreated natural fabrics may continue to burn until the fabric is totally consumed. Synthetic fabrics that are not flame resistant will also burn, with melting and dripping causing severe contact burns to the skin. In fact, various government reports may note that the vast majority of severe and/or fatal burn injuries may be due to the ignition and/or continued burning of an individual's clothing, and possibly not to exposure to the source of ignition itself.

Perhaps as a direct result, Occupational Safety and Health Administration (OSHA) regulations, American Society for Testing and Materials (ASTM) standards, National Fire Protection Association (NFPA) recommendations, and corporate safety guidelines may have encouraged, the adoption or flame resistant clothing for worker protection where a flash fire and/or electric arc hazard may be identified. In the prior art, chemical, petrochemical, and/or utility workers may have worn flame resistant clothing as a protective barrier against the intense neat from flash fires and electric arcs, and possibly to give such wearers a few extra seconds of escape time. Shirts, pants, coveralls, sweatshirts, rain wear, insulated all-season coveralls and coats may be commonly constructed using flame resistant materials. Other end users of flame resistant clothing in single and/or multi-layered configurations may include welders, firefighters, race car drivers and their crews, as well as the military, NASA astronauts, and rocket fuel handlers.

From the perspective of an individual worker and/or a company's purchasing manager, the best flame resistant clothing purchase may ideally consist of garments that may be comfortable and/or offer the highest level of protection to numerous types of hazards. Also, most purchasing managers may generally agree that one of the most critical indicators of the success of a workplace protective apparel program may not necessarily reside in the protection offered by their flame resistant clothing. Rather, success may often be measured by the level of acceptance that the protective clothing may receive from the workers who may use the clothing on a daily basis, possibly without supervision and/or complaints about poor garment comfort, fit and/or style. Unfortunately, comfort and protection may long have been perceived to be mutually exclusive when it comes to flame resistant work clothing. Conventional thinking may have taught, perhaps more so than any other factor, that thermal protection may be largely a function of the thickness of an un-breached and/or non-permeable barrier between a wearer and a hazard. Also, the level of protection may generally have been thought to result from fabric composition, and/or the level of protection may have typically been thought to increase with higher fabric weights. Since higher fabric weights and/or thicknesses, combined with a general lack of breathability in a tightly woven fabric texture, may be commonly associated with poor comfort, it may not have been easy, in the prior art, to find protective clothing with both the highest level of protection and comfort, offered in the same garment, particularly as the issue of comfort may relate to worker heat prostration issues. As a result, managers and/or purchasers may long have struggled to find an acceptable balance between the two in the prior art, and manufacturers may even have taken tremendous steps to provide garment choices that are softer, lighter in weight, more breathable, and/or more comfortable.

A particular type of protective clothing, hood devices, are often worn for protection in various industries, such as, the metal working industry, the chemical industry, and/or the medical industry. Hoods can be made of protective materials. For example, hoods can protect the wearer from such conditions as high temperatures, dangerous chemicals or materials, and/or a contaminated environment.

Certain types of hoods form a seal from the outside environment to protect the wearer from this environment. A sealed hood provides limited access to the inside of the hood on the wearers head. Body heat and perspiration from the wearer can build up within the sealed hood and can cause discomfort for the wearer and even fog within the hood that limits the wearers view outside the hood.

Sometimes, a ventilation system is incorporated into the hood to provide fresh airflow within the hood for the user and/or for cooling the user. Powering a ventilation system can be difficult as the ventilation system can require electrical cords connecting a power source to the ventilation system. The user can be limited in his/her movement by the length of the electrical cords and/or the electrical cords can tangle.

There is a need for an improved protective hood and fan assembly. Certain embodiments of the present invention address these and other needs.

It would be beneficial to provide overcome the deficiencies of the prior art by providing protective clothing that is effective and provides proper comfort and mobility to the wearer. In addition is would be beneficial to provide a protective shroud/hood which provides sufficient air flow to enhance the comfort and safety of the wearer.

SUMMARY OF THE INVENTION

An embodiment is directed to an article of outerwear which resists ignition and insulates against heat, the article of outerwear has a plurality of sections made from woven fabric, knit fabric or a combination thereof. The plurality of sections allow the article of outerwear to stretch to enhance the comfort of the wearer of the article of outerwear.

An embodiment is directed to a protective hood or shroud with one or more fan assemblies. The one or more fan assemblies have air intake openings and vent openings which allow air to flow from the one or more fan assemblies to an interior of the protective hood or shroud. The air intake openings extend in planes which are perpendicular to planes in which the vent openings extend.

An embodiment is directed to a protective hood or shroud with one or more fan assemblies to circulate air inside the protective hood or shroud. The one or more fan assemblies have air intake openings and vent openings, the vent openings are positioned proximate a back of a neck of a wearer to facilitate the air to flow from the one or more fan assemblies to an interior of the protective hood or shroud.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
FIG. 1 is a perspective view of an illustrative protective article of clothing of the present invention, the illustrative article of protective clothing is a bib.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto. The present system includes a protective shroud/hood having at least front and rear portions for surrounding the corresponding areas of a wearer's head. The protective shroud/hood defines a vent opening in the rear portion of the shroud/hood. A transparent viewing window is typically mounted to the front portion of the shroud/hood.

Figure 2:
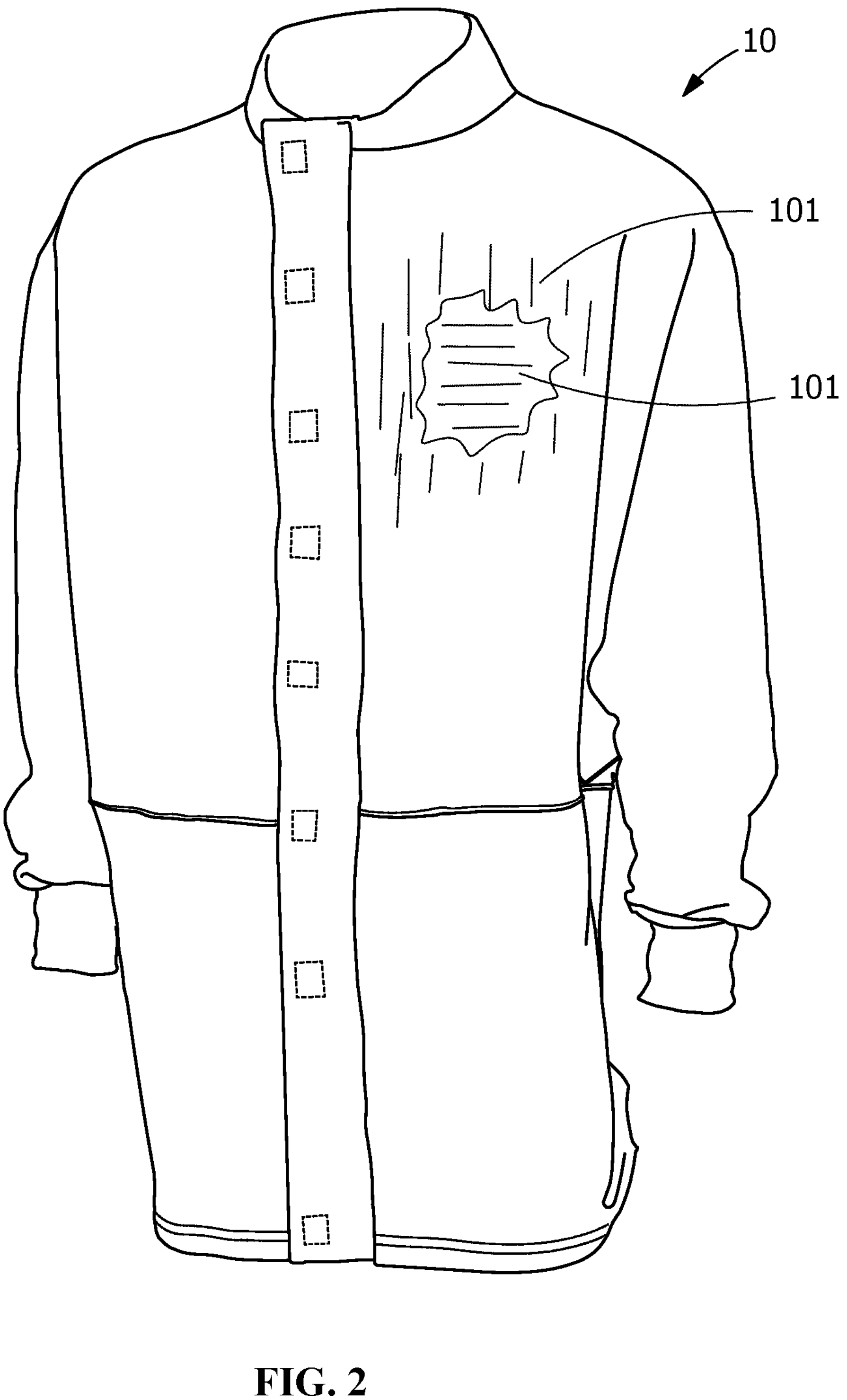
FIG. 2 is a perspective view of another illustrative protective article of clothing of the present invention, the illustrative article of protective clothing is a jacket.

FIGS. 1 and 2 illustrate an arc flash and flash fire resistant coat or jacket 10 and arc flash and flash fire resistant bib 12 which are made according to subject invention and from the material or fabric described below. However, other garments or articles of outwear may be made with the material or fabric. In accordance with an aspect of the invention, the garments are made from any material which has been tested and approved for arc flash, such as, but not limited to, fabrics which include NORFAB, para-aramid, modacrylic, ULTRA SOFT, TECASAFE, NOMEX, PROTERA, treated cotton, KYNOL, BASOFIL, meta-aramid, TENCEL, and/or SPANDEX.

The garment or outerwear which resists ignition and insulates against heat. The garment or outerwear may be made from woven material or fabric, knit material or fabric or from a combination thereof. The garment may have one or more layers of material or fabric which are arc flash and flash fire resistant. The material or fabric has the ability to stretch to enhance the comfort of the wearer of the garment or article of outerwear. In general, a knit fabric in made from a single yarn looped continuously to produce a braided look, while a woven fabric is made from multiple yarns crossing each other at right angles to form the grain.

In garments with multiple layers, the different material or fabric of the layers may be oriented in different directions, such as perpendicular to each other to increase the arc flash and flash fire resistant characteristics of the garment.

The present invention provides a garment that is flexible and is arc flash and flash fire resistant with a 40 cal/cm$^2$ or greater arc rating which meets: ASTM F1959/F1959M-12: "Standard Test Method for Determining the Arc Rating of Materials for Clothing"; ASTM F1506-10a: "Standard Performance Specification for Flame Resistant and Arc Rated Textile Materials for Wearing Apparel for Use by Electrical Workers Exposed to Momentary Electric Arc and Related Thermal Hazards"; and ASTM F2178-17b: "Standard Test Method for Determining the Arc Rating and Standard Specification for Eye or Face Protective Products." A face shield is provided which meets: ANSI Z87.1: "American National Standard for Occupational and Educational Personal Eye and Face Protection Devices." A hard hat is provided which meets: ANSI Z89.1: "American National Standard for Industrial Head Protection."

Figure 3:
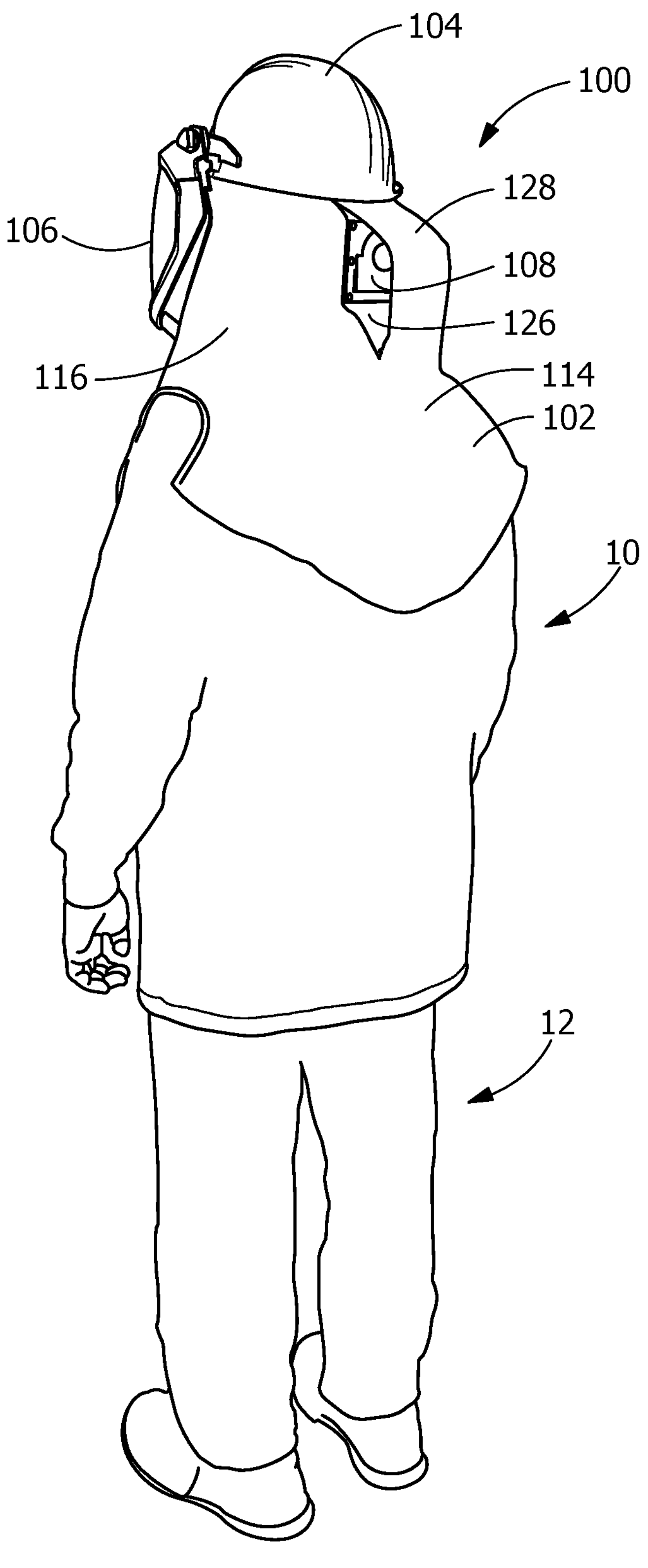
FIG. 3 is a back perspective view of a user wearing the bib of FIG. 1, the jacket of FIG. 2 and an illustrative protective shroud/hood of the present invention.
Figure 7:
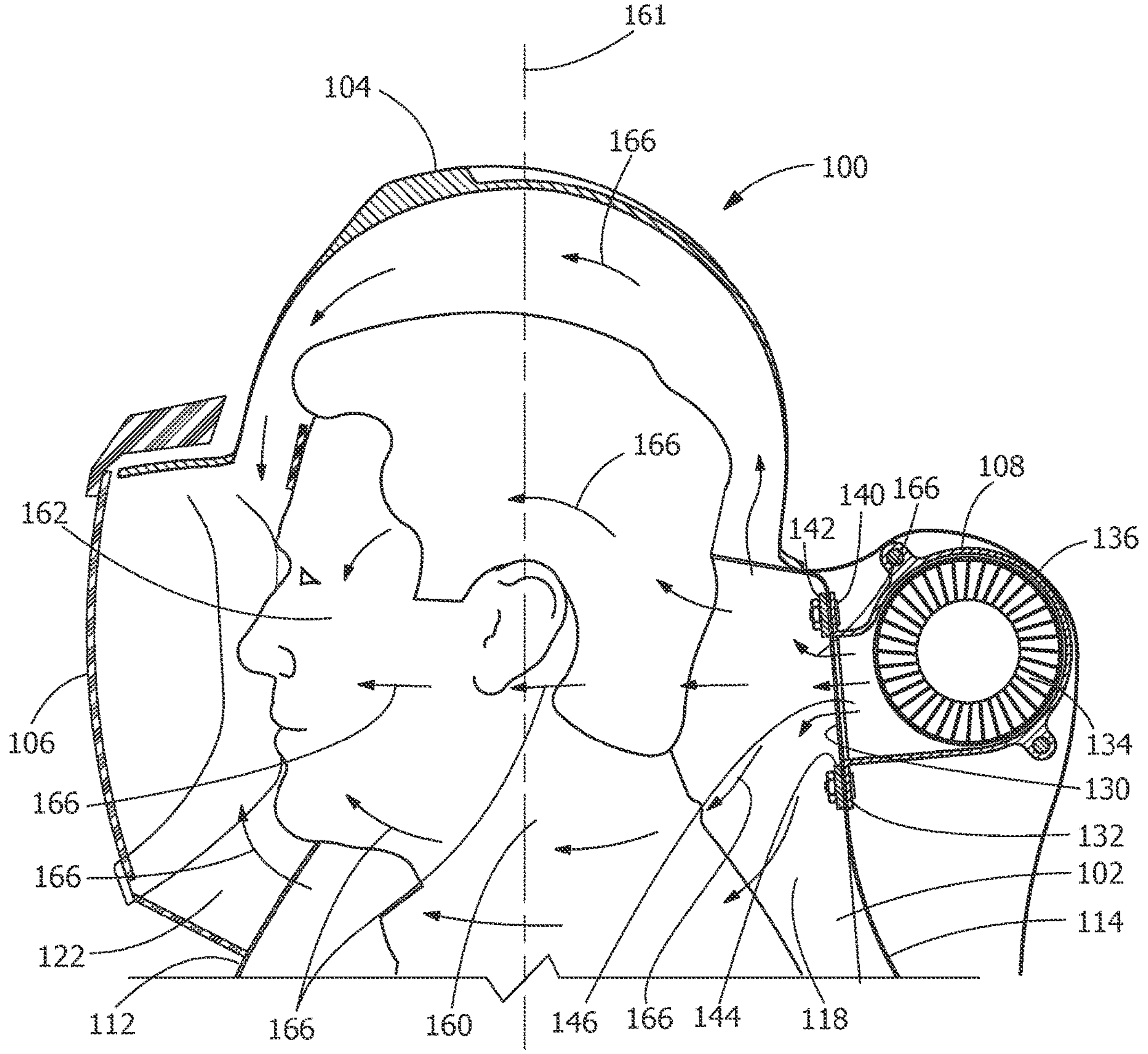
FIG. 7 is a diagrammatic view of the air flow through the fans and around a wearers head when the when the shroud/hood is properly positioned on the wearer.

As shown in FIGS. 3 through 7, an illustrative protective system 100 includes a shroud/hood 102, a helmet or hard hat 104, a transparent viewing window 106, and one or more fan assemblies 108. As best shown in FIG. 7, the shroud/hood 102 has a front surface 112, a rear surface 114 and side surfaces 116 (FIG. 3). An interior cavity 118 extends between the front surface 112, the rear surface 114, and the side surfaces 116. The interior cavity 118 is dimensioned to fit a person's head. While a shroud 102 is shown, the shroud may be replaced with a hood which has a top surface.

Figure 4:
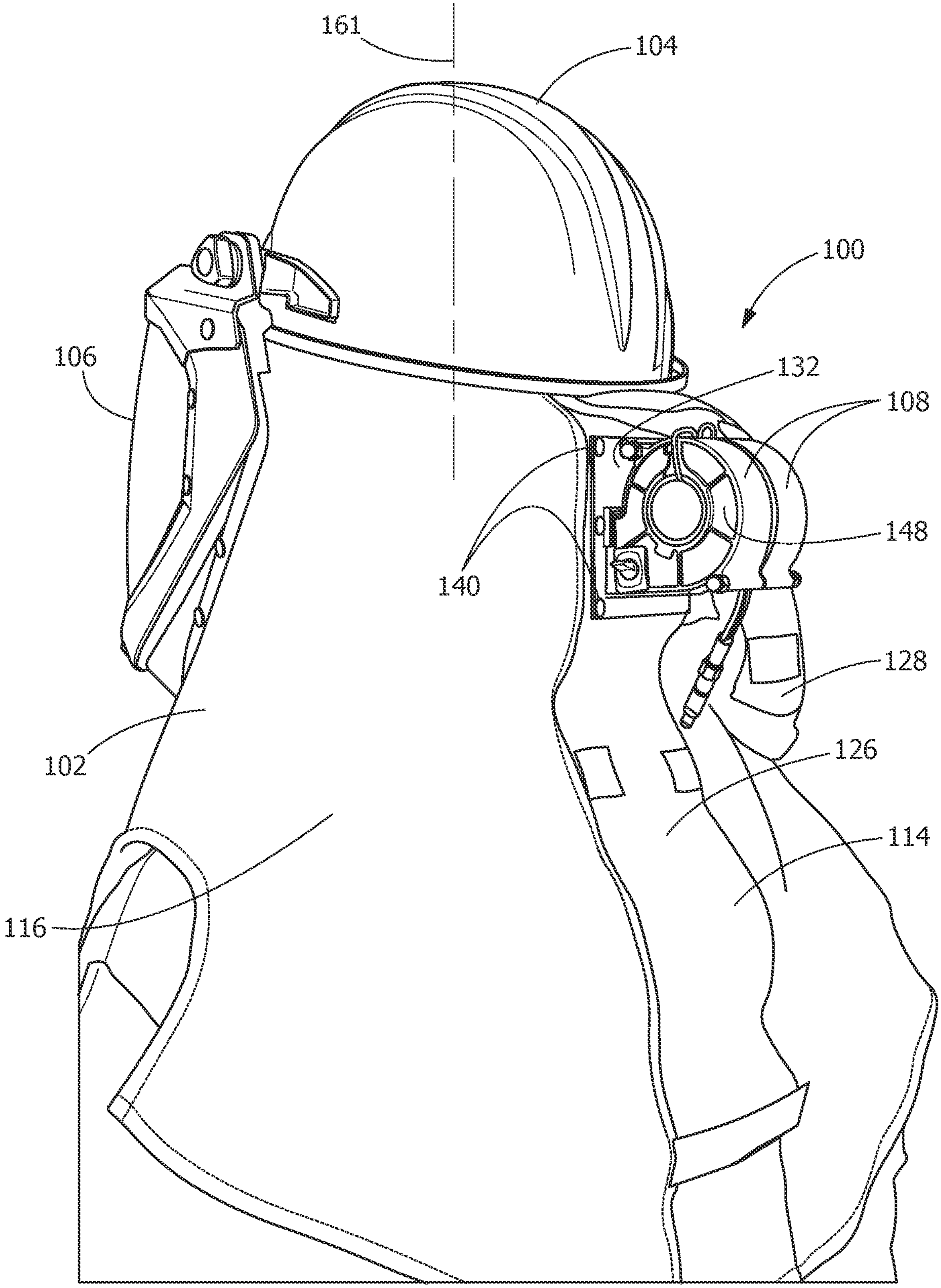
FIG. 4 is a back perspective view of the protective shroud/hood of FIG. 3 with a movable protective cover displaced to the side.
Figure 5:
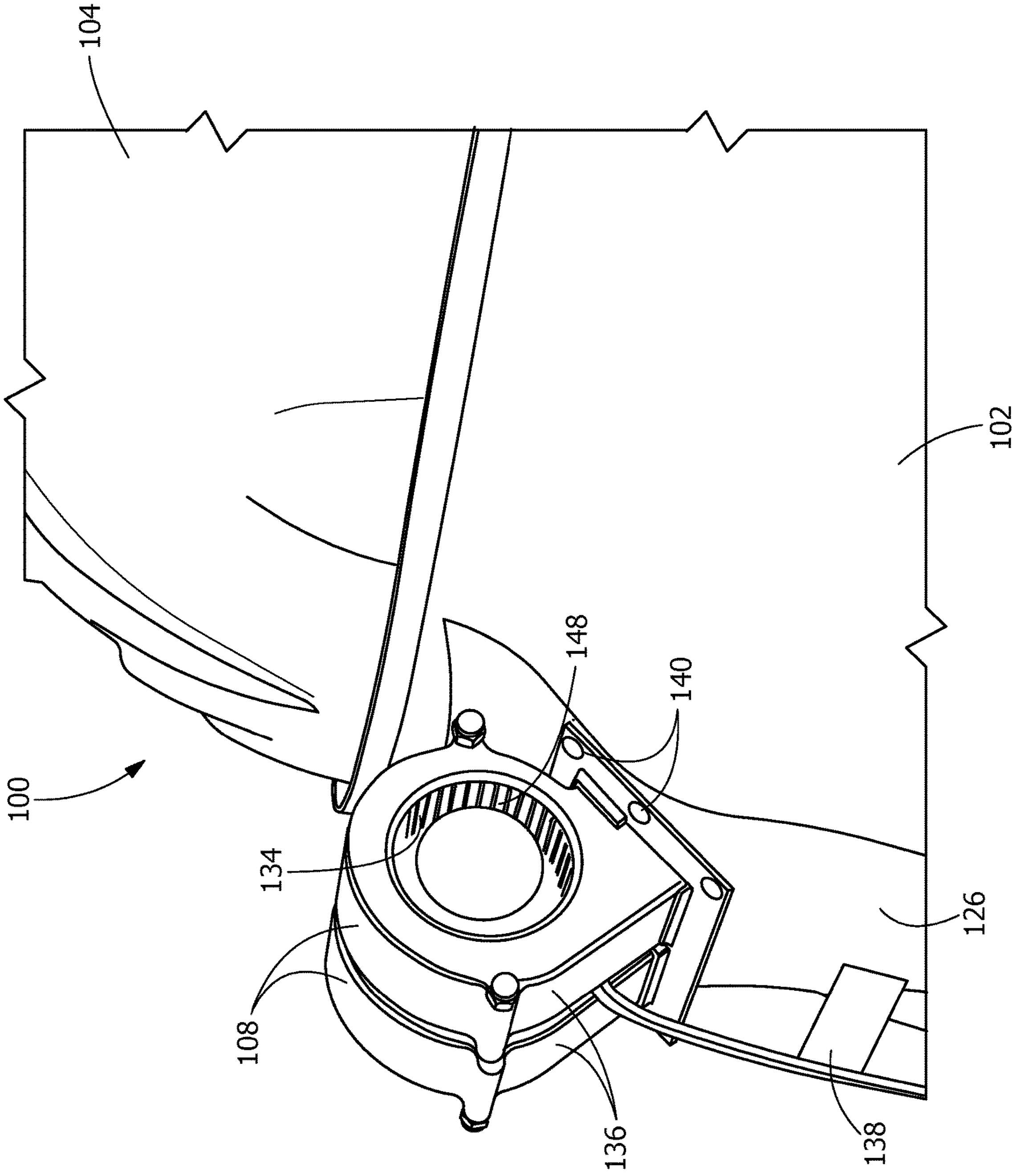
FIG. 5 is an enlarged perspective view of fans attached to the protective shroud/hood.
Figure 6:
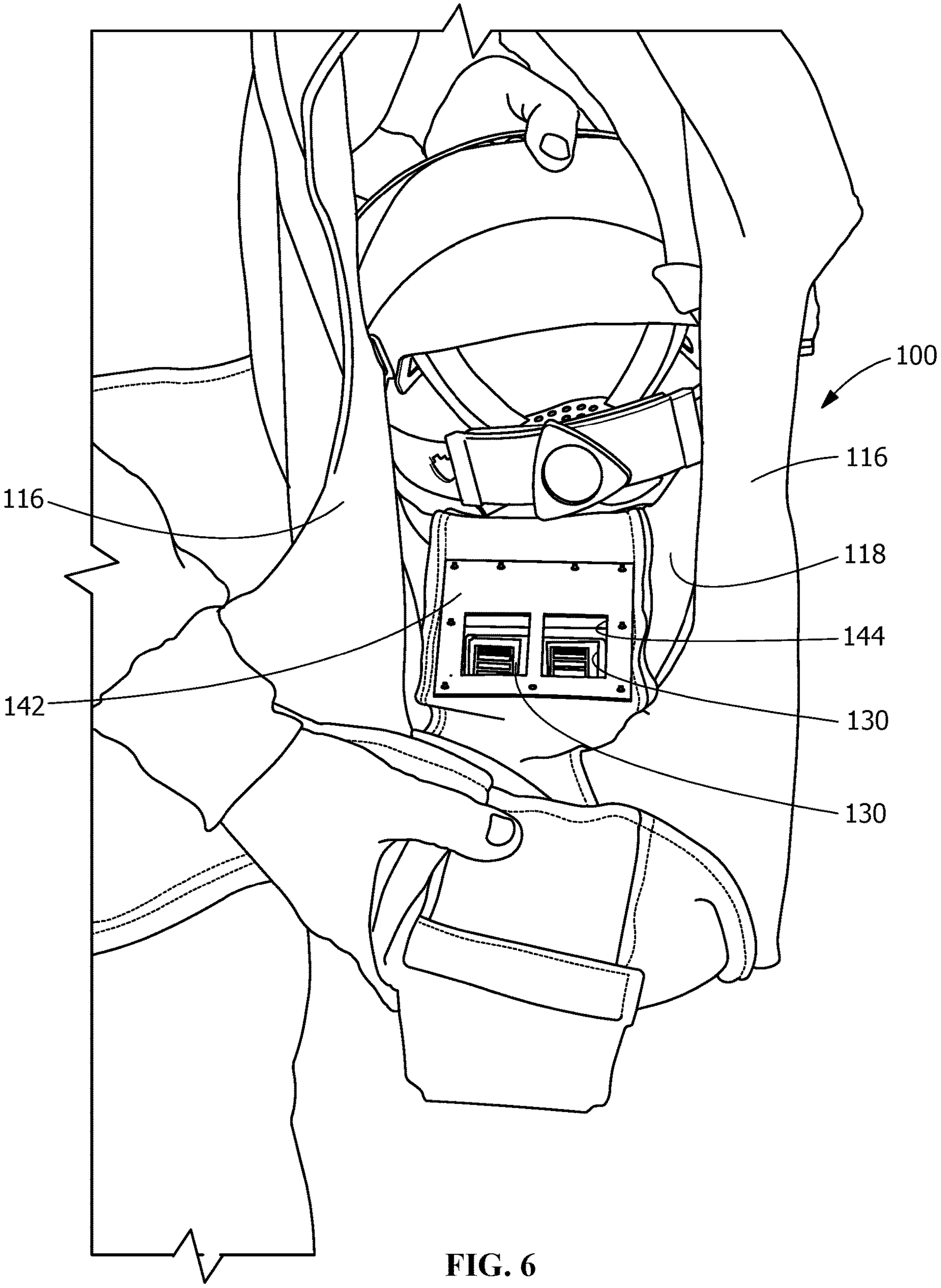
FIG. 6 is a front view of a back inside surface of the protective shroud/hood of FIG. 3.

The front surface 112 includes a shield opening 122 for receiving the transparent face shield or viewing window 106 or for having a transparent viewing window 106 positioned thereover. The shroud/hood 102 is constructed of material which resists ignition and helps insulate against heat, such as, but not limited to synthetic fiber for use in protective ballistic clothing or protective fire clothing sandwiched between layers of other synthetic fiber for use in protective clothing or protective fire clothing. In the illustrative embodiment shown, the shroud/hood 102 is a multi-layered, lightweight, and flexible material. Various materials may be used to form shroud/hood 102, such as, woven fabric, non-woven fabric, or a variety of natural or synthetic fibers. For example, the shroud/hood 102 may be made from woven material or fabric, knit material or fabric or from a combination thereof. The shroud/hood 102 may have one or more layers of material or fabric which are arc flash and flash fire resistant. The material or fabric has the ability to stretch to enhance the comfort of the wearer of the garment or article of outerwear A mounting strip of material 126, as shown in FIGS. 4 and 5, is provided in the rear surface 114 of the shroud/hood 102. The mounting strip 126 has a generally rectangular shape and may be of made of the same material as the remainder of the shroud/hood 102 or may be made of a different material which has stiffer and stronger characteristics to allow mounting of devices thereto. Such material includes, but is not limited to, leather or material with a stiffening insert that is flame resistant. The shroud/hood 102 includes a rear flap 128 (FIG. 3) which is positioned in line with the mounting strip 126. In the illustrative embodiment, the rear flap 128 has a generally rectangular shape. The shape of the mounting strip and the rear flap 128 may vary. The rear flap 128 is flexible to allow the rear flap 128 to be moved as required.

One or more vent openings 130, FIG. 7, are provided in the mounting strip 126. The vent openings 130 extend into the interior cavity 118. The vent openings 130 have a rectangular configuration and are dimensioned to allow air to enter the interior cavity 118, as will be more fully described. Other shapes of the vent openings 130 may be used. The vent openings 130 are positioned to extend into the interior cavity 118 at a location proximate the neck of the wearer of the shroud/hood 102. The proper positioning of the vent openings 130 facilitates the proper flow of air in the interior cavity 118 to provide proper ventilation to the wearer to keep the wearer cool. In addition, the proper flow of air in the interior cavity 118 also prevents the transparent viewing window 106 from fogging, thereby enhancing the effectiveness and safety of the shroud/hood 102.

The shroud/hood 102 may be worn over the hard hat 104 or under the hard hat 104. The transparent viewing window 106 may be integrally attached to the shroud/hood 102 or may be part of the hard hat 104. The transparent viewing window 106 may have an arched or curved cross-sectional shape or other known shapes.

The shroud/hood 102, hard hat 104 and transparent viewing window 106 are all constructed of material which resists ignition and helps to insulate against heat. For example, shroud/hood 102, hard hat 104 and transparent viewing window 106 all have a 40 cal/$cm^2$ arc rating.

Each of the one or more fan assemblies 108 has an outside mounting plate 132, a fan 134, a housing 136 and a power source (not shown). In the embodiment shown, the outside mounting plate 132 has a rectangular shape, however, other shapes of the outside mounting plate 132 may be used. The outside mounting plate 132 is preferably mountable on shroud/hood 102 to cover the one or more vent openings 130 are provided in the mounting strip 126. The outside mounting plate 132 is attached to shroud/hood 102 by adhesive or mounting hardware 140 which extends through the mounting strip 126 of the shroud/hood 102 and through a mounting plate 142 positioned in the interior cavity 118 of the shroud/hood 102. The mounting hardware 140 may be, but is not limited to, rivets or nuts and bolts. The mounting plate 142 having vent openings 144 which align with vent openings 130.

The housing 136 is mounted to and extends from the outside mounting plate 132. Screws, bolts or other known fasteners (not shown) can be used to mount the housing 136 to the outside mounting plate 132. The housing 136 has an air release, exhaust or vent opening 146 for allowing air circulated by the fan 134 to be moved through the vent opening 146. When assembled the vent openings 146 of the housing 136 is align with vent openings 130 and vent openings 144. The housing 136 has air receiving passages or air intake openings 148 positioned on the sides of the housing 136 proximate the fan 134 to allow the fan to draw in air from the sides of the fan 134 as the fan 134 is operated. In the illustrative embodiment, the air intake openings 148 open in planes which are perpendicular to planes in which the vent openings 146 open, however, other configurations may be used.

The shroud/hood 102 or the outside mounting plate 132 may include a cavity or pocket (not shown) for receiving and storing the power source (not shown) attached to a fastening strip 138. The power source may be any type of portable power source which provide sufficient power and which is safe to operate, such as, but not limited to, a battery pack.

In operation, the fan 134 force or directs air from the outside of the shroud/hood 102 to the interior cavity 118 of the shroud/hood 102 to provide proper ventilation to the wearer of the shroud/hood 102. The air passes through the vent openings 146 of the housing 136, the vent openings 130 and the vent openings 144 into the interior cavity 118 of the shroud/hood 102.

A switch (not shown) may be provided to turn on an off the power source to engage and disengage the fan 134. The switch may be provided on the power source or at other locations to facilitate the ability of the wearer to turn the fan 134 on and off. The switch can be any type of switches which are known in the industry.

As shown in FIG. 7, when in use, the fan 134 directs the airflow of the outside air into the interior cavity 118 of the shroud/hood 102 proximate a neck 160 of the wearer 162. As the neck 160 is removed or spaced from the vent openings 144 into the interior cavity 118 of the shroud/hood 102, the airflow from the vent openings 144 is not restricted. This allows the air flow to flow in the interior cavity 118 of the shroud/hood 102 around the wearer 162 as represented by the arrows 166. In addition, as two vent openings 144 extend into the interior cavity 118 of the shroud/hood 102, the vent openings 144 are positioned offset from the longitudinal center axis of the neck 160 of the user 162. The longitudinal center axis of the neck being defined as the axis which extends thru the center of the neck from the head of the user to the torso of the user, as represented by 161 in FIG. 7. This allow the airflow from the vent openings 144 to flow to either side of the user 162, thereby providing sufficient and even flow of the air throughout the entire volume of the interior cavity 118 of the shroud/hood 102.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A protective hood or shroud comprising:

a first vent opening extending through the protective hood or shroud, the first vent opening configured to be positioned proximate a neck of a user;

a mounting plate mounted on the protective hood or shroud, two second vent openings extending through the mounting plate, the second vent openings provided in line with the first vent opening, each second vent opening of the second vent openings configured to be positioned offset from a longitudinal center axis of the neck of the user;

two fan assemblies mounted on the mounting plate, the two fan assemblies having air intake openings and third vent openings which allow air to flow from the two fan assemblies through the second vent openings and the first vent opening and into an interior cavity of the protective hood or shroud;

the air intake openings of the two fan assemblies face in opposite direction and extend in planes which are perpendicular to planes in which the third vent openings extend;

wherein the fan assemblies direct the airflow of outside air into the interior cavity proximate the neck of the user;

wherein the airflow from each of the second vent openings of the second vent openings flows to either side of the neck of the user, providing sufficient and even airflow throughout an entire volume of the interior cavity of the protective hood or shroud.

2. The protective hood or shroud as recited in claim 1, wherein the protective hood or shroud has a front surface, a rear surface and side surfaces, the interior cavity extends between the front surface, the rear surface, and the side surfaces, the interior cavity is dimensioned to fit user's head, the first vent opening extends through the rear surface.

3. The protective hood or shroud as recited in claim 2, wherein the protective hood or shroud includes a helmet and a transparent viewing window.

4. The protective hood or shroud as recited in claim 1, wherein the protective hood or shroud is constructed of material which resists ignition and helps insulate against heat.

5. The protective hood or shroud as recited in claim 4, wherein the material has a layer of fibers for which is sandwiched between other layers of different fibers.

6. The protective hood or shroud as recited in claim 5, wherein the layer of fibers may be made from woven fabric, non-woven fabric, natural fibers, synthetic fibers or a combination thereof.

7. The protective hood or shroud as recited in claim 6, wherein the layer of fibers is arc flash and flash fire resistant with a 40 $cal/cm^2$ or greater arc rating.

8. The protective hood or shroud as recited in claim 2, wherein a mounting strip of material is provided on the rear surface.

9. The protective hood or shroud as recited in claim 8, wherein the mounting strip has a generally rectangular shape and is made of material which is different than material of the rear surface, the mounting strip is configured to be stiffer and stronger than the rear surface.

10. The protective hood or shroud as recited in claim 8, wherein a rear flap is positioned in line with the mounting strip.

* * * * *